(12) United States Patent
Okuma (10) Patent No.: US 10,122,964 B2
(45) Date of Patent: Nov. 6, 2018

(54) COMMUNICATION SYSTEM (71) Applicant: CANON KABUSHIKI KAISHA, Tokyo (JP)

(72) Inventor: Keisui Okuma, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/141,440

(22) Filed: Apr. 28, 2016

(65) Prior Publication Data
US 2016/0330407 A1 Nov. 10, 2016

(30) Foreign Application Priority Data

May 8, 2015 (JP) .................. 2015-095886

(51) Int. Cl.
H04M 7/14 (2006.01)
H04N 7/14 (2006.01)
(52) U.S. Cl.
CPC .................. H04N 7/147 (2013.01)
(58) Field of Classification Search
USPC ....................................... 348/14.08
See application file for complete search history.

(56) References Cited

U.S. PATENT DOCUMENTS

| 6,922,494 | B1 | 7/2005 | Fay |
| 8,300,081 | B1 | 10/2012 | Sawyer |
| 8,994,775 | B2 | 3/2015 | Lee et al. |
| 9,030,520 | B2 * | 5/2015 | Chu .......................... H04N 7/15 348/14.01 |
| 9,363,476 | B2 * | 6/2016 | Fish ......................... G06F 3/041 |
| 2001/0026247 | A1 | 10/2001 | Nishio et al. |
| 2009/0199078 | A1 | 8/2009 | Caspi et al. |
| 2012/0293606 | A1 | 11/2012 | Watson et al. |
| 2013/0050398 | A1 | 2/2013 | Krans et al. |
| 2013/0222521 | A1 * | 8/2013 | Lee .......................... H04N 7/142 348/14.02 |
| 2013/0335508 | A1 * | 12/2013 | Mauchly .................. H04N 7/15 348/14.08 |
| 2014/0063178 | A1 | 3/2014 | Krans et al. |
| 2015/0009278 | A1 * | 1/2015 | Modai ....................... H04N 7/15 348/14.08 |
| 2015/0163400 | A1 * | 6/2015 | Geiss .................. H04N 5/23229 348/231.99 |
| 2016/0080691 | A1 | 3/2016 | Yarosh et al. |
| 2016/0260236 | A1 | 9/2016 | Fogarty et al. |
| 2016/0328201 | A1 | 11/2016 | Ito |
| 2016/0330406 | A1 | 11/2016 | Muramatsu |

FOREIGN PATENT DOCUMENTS

| JP | 11-75174 A | 3/1999 |
| JP | 2008-191613 A | 8/2008 |

* cited by examiner

*Primary Examiner* — Amal Zenati
(74) *Attorney, Agent, or Firm* — Canon USA, Inc. I.P. Division (57) ABSTRACT

Either of a first person image capturing a person located in front of a first projection surface from a first projection surface side and a second person image capturing the person from an opposite side of the first projection surface with respect to the person is projected on a second projection surface of a remote place.

25 Claims, 6 Drawing Sheets

OFFICE 1 (HEAD OFFICE)

FIG.1A

OFFICE 1 (HEAD OFFICE)

FIG.1B

OFFICE 2 (BRANCH OFFICE A)

FIG.2A
OFFICE 1

FIG.2B
OFFICE 2

FIG.3

FIG.4A
OFFICE 2 BEFORE DISPLAYING MATERIALS

FIG.4B
OFFICE 2 AFTER DISPLAYING MATERIALS

COMMUNICATION SYSTEM

BACKGROUND OF THE INVENTION

Field of the Invention

The present disclosure relates to a communication system for communicating with a remote place.

Description of the Related Art

Systems for communicating with people who are in separated places (remote places) have been known. Japanese Patent Application Laid-Open No. 2008-191613 describes a remote conference system for having a conference with a person in a remote place. The system described in Japanese Patent Application Laid-Open No. 2008-191613 includes a camera for capturing an image of a person, a projector for projecting an image, and a screen on which the image projected by the projector is displayed.

According to the system described in Japanese Patent Application Laid-Open No. 2008-191613, while an image of a person captured by a camera disposed in a certain conference room is projected on a screen by a projector of a partner side (the remote place), an image of a person captured by a camera of the partner side is projected on a screen by a projector in the conference room. Further, Japanese Patent Application Laid-Open No. 2008-191613 describes that realistic sensation of the conference is enhanced by projecting a life size image of a person.

In the system described in Japanese Patent Application Laid-Open No. 2008-191613, the camera is used to capture an image of a front side of a person. Thus, when a plurality of people communicates with each other face-to-face, it can be thought that the system described in Japanese Patent Application Laid-Open No. 2008-191613 is effective. However, for example, when assuming a meeting in an office as communication, the system described in Japanese Patent Application Laid-Open No. 2008-191613 may not be able to provide sufficient communication.

In the case of a meeting, a person may move in front of a screen to point at a material projected on the screen or newly write something on a whiteboard. However, according to the system described in Japanese Patent Application Laid-Open No. 2008-191613, the camera is not directed to a direction of the screen or the whiteboard and thus cannot capture an action of a person who moves to the front of the screen or the whiteboard. The system described in Japanese Patent Application Laid-Open No. 2008-191613 cannot transmit the action of the person who moves to the front of the screen or the whiteboard to the remote place and thus cannot sufficiently communicate with the remote place.

SUMMARY OF THE INVENTION

According to an aspect of the present disclosure, a communication system includes a first projection unit configured to project an image on a first projection surface, a first imaging unit configured to capture a first image of a person located in front of the first projection surface from a first projection surface side, a second imaging unit configured to capture a second image of the person from an opposite side of the first projection surface with respect to the person, a selection unit configured to select either of the first person image captured by the first imaging unit and the second person image captured by the second imaging unit as a person image to be projected on a second projection surface, and a second projection unit configured to project the person image selected by the selection unit on the second projection surface.

According to other aspects of the present disclosure, one or more additional communication systems, one or more methods and one or more mediums are discussed herein. Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the attached drawings. The exemplary embodiments which will be described below do not restrict to, and do not restrict, the disclosure and/or invention according to the claims. All of the combinations of the features described in the exemplary embodiments are not always essential to the means for solution according to the disclosure.

Figure 1A:
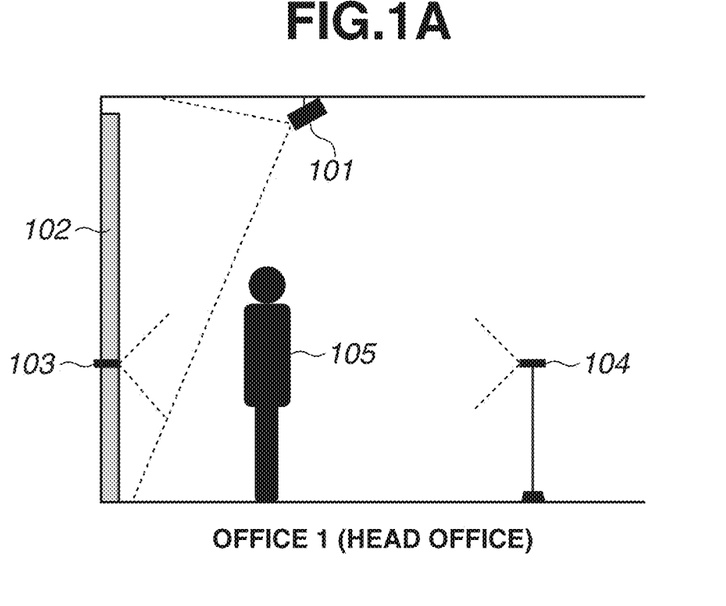
FIGS. 1A and 1B illustrate a configuration of a communication system.
Figure 1B:
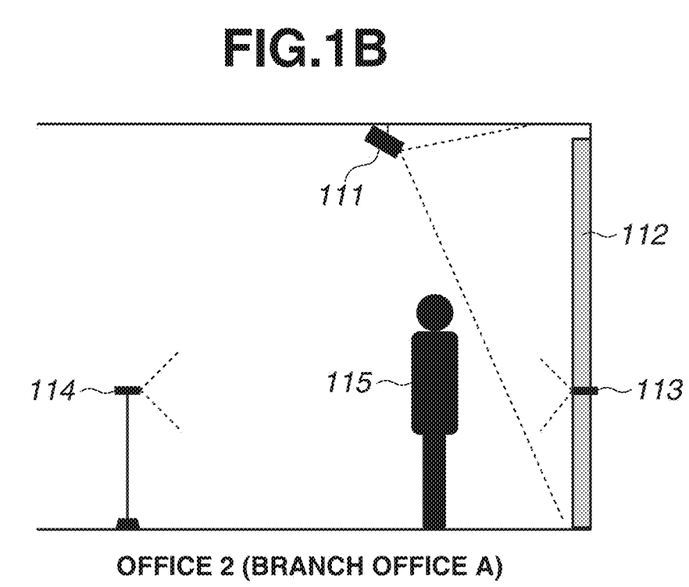

FIGS. 1A and 1B are cross sections of a communication system to which the present disclosure is applied. Using the communication system enables to an office 1 set up in a head office and an office 2 set up in a branch office A to communicate with each other. Two offices are described here as an example, however, the present disclosure can be applied to a configuration in which three or more offices can communicate with each other.

Each office described here may be separated from each other which takes several hours to move one from the other or may be different conference room in the same building. In other words, the expression of "remote" indicates that physically spaces are separated and is not to define a physical distance and a length of time taken to move therebetween.

The office 1 illustrated in FIG. 1A is provided with a projector 101, a screen 102, a front camera 103, and a rear camera 104. The projector 101 is a projection device for projecting an image captured in another office on the screen 102. According to the present exemplary embodiment, images captured by the front camera 103 and the rear camera 104 and an image projected on the screen 102 are assumed as moving images, however, these images may be still images.

The projector 101 according to the present exemplary embodiment projects a below-described meeting material on the screen 102, however, a different projector may be prepared as a projector for projecting the meeting material. Further, the projector 101 may extract a person image from an image to be projected and project a composite image in which the extracted person image and a background image are composited on the screen 102. For the background image, a fixed background image prepared in advance may be used, or a real time background image may be obtained by separately preparing a background camera for capturing a background of the office 1.

The screen 102 is a projection surface for displaying an image projected by the projector 101. The screen 102 may be temporarily disposed for communicating with another office, or a wall of the office may be used as the screen 102. According to the present exemplary embodiment, the example is described in which the projector and the screen are used as units for displaying an image, however, a large liquid crystal display may be used to display an image.

The front camera 103 is an imaging device for capturing an image of a person 105 and embedded in the screen 102. The front camera 103 is a camera for capturing a front side of the person 105 standing in front of the screen 102 from a screen 102 side which is a projection surface side. The front camera 103 is set on a position illustrated in FIG. 1A so as to be able to capture the front side of the person 105 when the person 105 faces toward the screen 102.

The rear camera 104 is an imaging device for capturing an image of the person 105. The rear camera 104 is a camera for capturing an image of a rear side of the person 105 standing in front of the screen 102 and an image displayed on the screen 102. The rear camera 104 is set on a position illustrated in FIG. 1A (a side opposite to the screen 102 with respect to the person 105) so as to be able to capture the rear side (back side) of the person 105 when the person 105 faces toward the screen 102.

The front camera 103 includes a distance sensor for detecting a distance to an object. Images to be obtained by the front camera 103 includes a color image including 8-bit 3-channel red green blue (RGB) information and a range image including 8-bit 1-channel information. By using the range image, the front camera 103 can measure a distance between the screen 102 and the person 105.

The office 2 (FIG. 1B) where a person 115 is present is also provided with equipment (a projector 111, a screen 112, a front camera 113, and a rear camera 114) similar to that in the office 1.

Figure 2A:
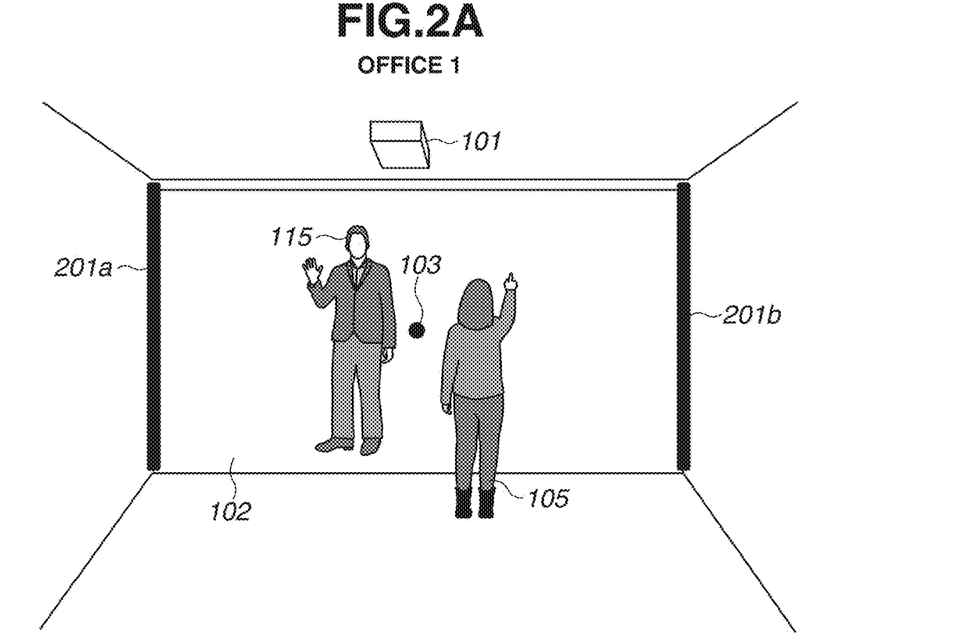
FIGS. 2A and 2B illustrate a configuration of the communication system.

FIG. 2A is an outline view of the communication system and illustrates that the person 105 in the office 1 communicates with the person 115 in the office 2. On the screen 102, an image of the person 115 captured by the front camera 113 in the office 2 (a front side of the person 115 in the case of FIG. 2A) is projected.

The office 1 is provided with a digitizer including a transmitter 201a and a receiver 201b. The digitizer is a detection device for detecting an action of a user performed with respect to the screen 102. When infrared light projected by the transmitter 201a is blocked by a part of a body of the person 105, a pointer held by the person 105, and the like, the digitizer outputs coordinates indicating a blocked position. The example in which the transmitter 201a and the receiver 201b are respectively disposed on the right and left of the screen 102 is described here, however, the transmitter 201a and the receiver 201b may be disposed on the top and bottom of the screen 102. Further, a method for detecting an action of a user is not limited to the digitizer, and the screen 102 may have a touch panel function to detect a position where the screen 102 is pressed.

FIG. 2A illustrates an example in which an image of the person 115 captured by the front camera 113 in the office 2 is projected on the screen 102, however, an image of the person 115 captured by the rear camera 114 in the office 2 can be projected on the screen 102.

Figure 2B:
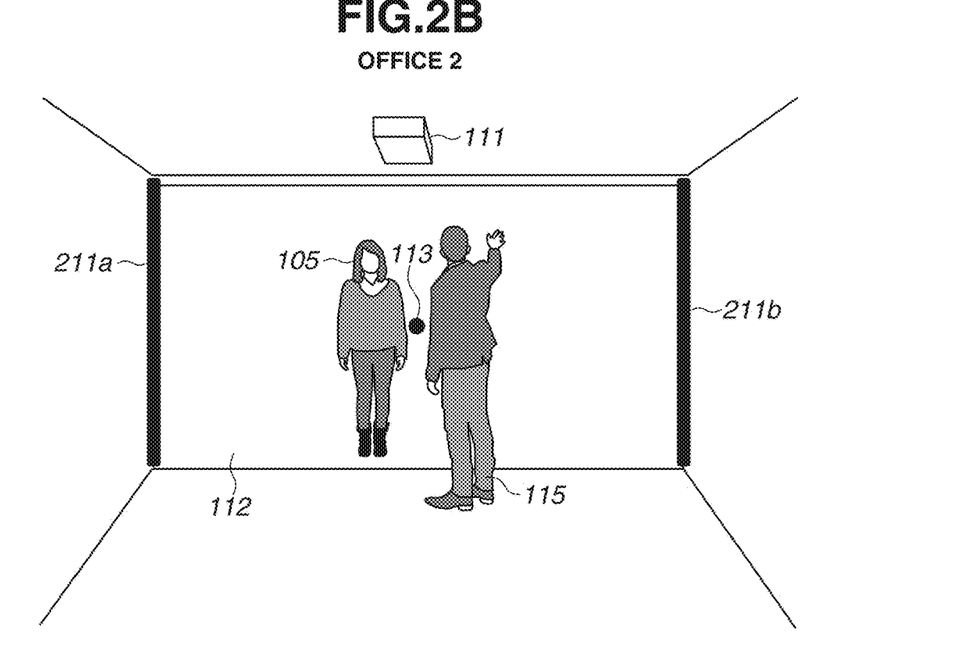

FIG. 2B illustrates a situation in the office 2. On the screen 112 in the office 2, an image of the person 105 captured by the front camera 103 in the office 1 (the front side of the person 105 in the case of FIG. 2B) is projected. The office 2 is also provided with a digitizer including a transmitter 211a and a receiver 211b as with the office 1. The office 2 can also project an image of the person 105 captured by the rear camera 104 in the office 1 on the screen 102.

Next, a hardware configuration of the communication system is described with reference to FIG. 3. It is not illustrated in FIGS. 1A, 1B, 2A, and 2B, the office 1 is provided with a control server 301. A central processing unit (CPU) 302 included in the control server 301 reads a control program stored in a read-only memory (ROM) 304 and controls each device provided in the office 1. A random access memory (RAM) 303 is used as a main memory of the CPU 302 and a temporary storage area of a work area and the like. In the office 1, a single CPU 302 executes each processing in a flowchart described below using a single memory (the RAM 303), however, another aspect may be applied. For example, each of the cameras, the projector, and the digitizer may be respectively provided with CPUs, and a plurality of CPUs and a plurality of RAMs, a hard disk drive (HDD), and a solid state drive (SSD) may execute each processing in cooperation with each other. In addition, a part of the processing described below may be executed using a hardware circuit such as an application specific integrated circuit (ASIC). A HDD 305 is used as a storage medium for storing various data pieces.

A network 300 is a network connecting each office. A type of the network 300 such as wired, wireless, a wide area network (WAN), a local area network (LAN), a public line, and a dedicated line may be appropriately selected according to an environment. A network interface (I/F) 310 is an interface for connecting the office 1 to the network 300.

It is not illustrated in FIGS. 1A, 1B, 2A, and 2B, each office is provided with a microphone and a speaker. A word spoken by a person in the office is converted into an audio signal by the microphone and output from a speaker in the remote place. The office 1 is provided with a microphone 311 and a speaker 312, and an audio I/F 307 is an interface for controlling audio input from the microphone 311 and audio output from the speaker 312.

A projector I/F 308 is an interface for controlling projection of an image by the projector 101. According to the present exemplary embodiment, a single projector is used to project an image on the screen, however, a plurality of projectors may be used to project an image on a screen when a width of the screen is large and the like.

A digitizer I/F 309 is an interface for controlling detection of an action of a user by the digitizer including the transmitter 201a and the receiver 201b. A camera I/F 306 is an interface for controlling image capturing by the front camera 103 and the rear camera 104.

The office 2 is provided with a control server 321 as with the office 1. The configuration of the control server 321 is similar to that of the control server 301 in the office 1, and thus the detailed description thereof is omitted.

Figure 3:
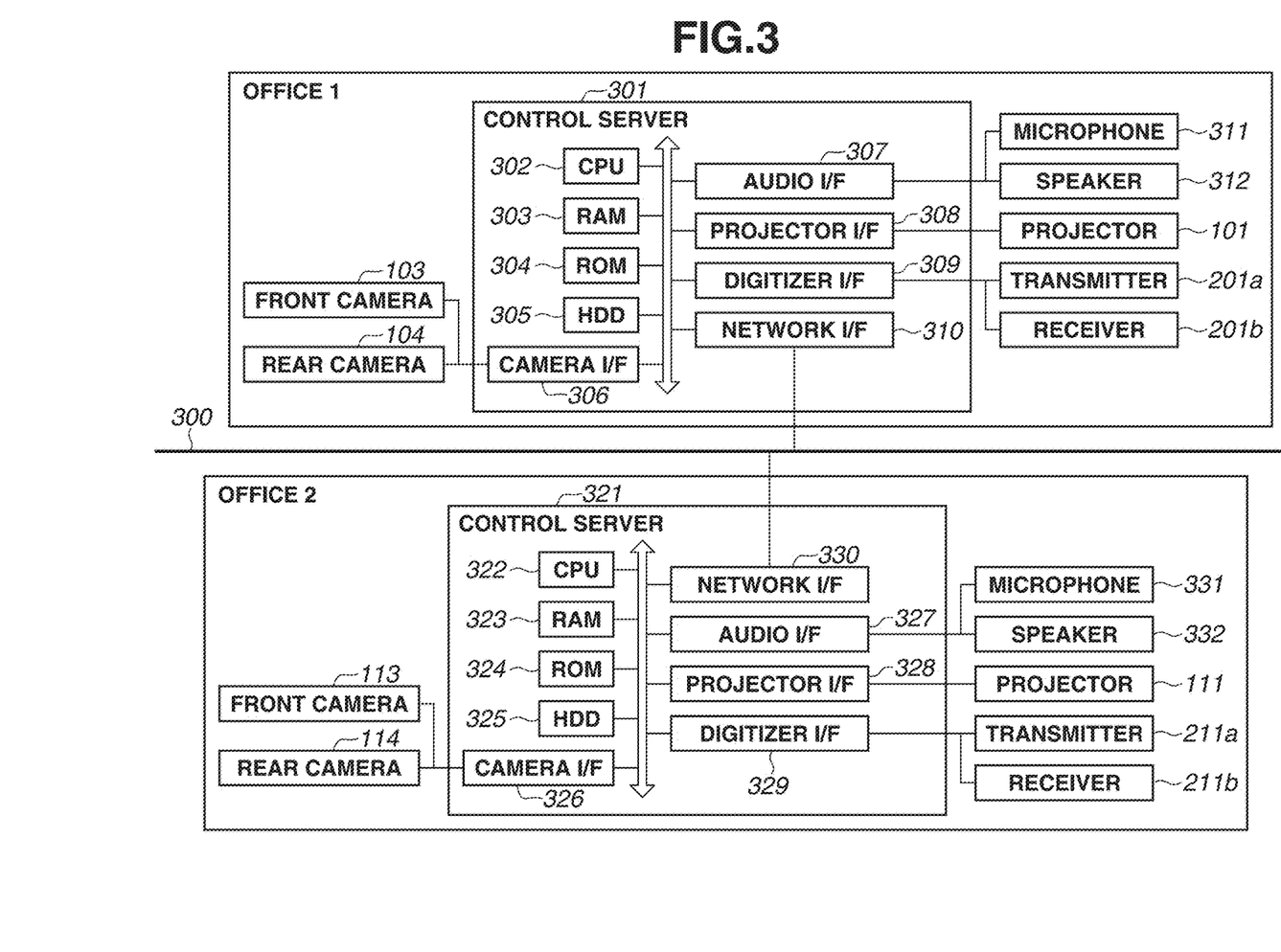
FIG. 3 illustrates a hardware configuration of the communication system.

To each interface described in FIG. 3, a Universal Serial Bus (USB), a High-Definition Multimedia Interface (HDMI) (registered trademark), a wired LAN, a wireless LAN, and others can be appropriately applied.

Figure 4A:
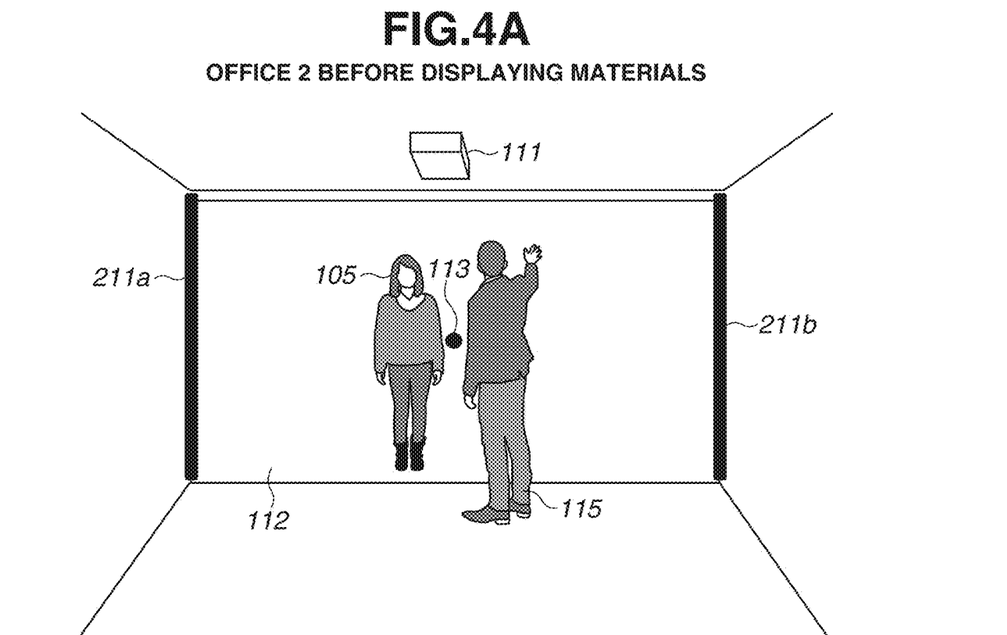
FIGS. 4A and 4B illustrate switching between a front image and a rear image.

Next, a configuration for changing an image projected on the screen from a captured image of the front camera to a captured image of the rear camera is described with reference to FIGS. 4A and 4B. FIG. 4A illustrates a situation in the office 2 and similar to FIG. 2B. When the person 115 in the office 2 and the person 105 in the office 1 talk face-to-face, it is desirable that the front camera 103 in the office 1 captures an image of the person 105, and the image captured by the front camera 103 is projected on the screen 112 in the office 2 as illustrated in FIG. 4A. In the following descriptions, an image captured by the front camera 103 may be referred to as a front image.

When a meeting is assumed as an example of communication, it can be thought that a meeting material is projected on the screen, and people in a plurality of offices communicate with each other while checking the meeting material. In the case of the meeting, it often happens that the person 105 in the office 1 makes communication while pointing at the meeting material, however, the front camera 103 cannot capture where the person 105 points at on the meeting material. Thus, the present exemplary embodiment is characterized in that, when the meeting material is displayed, an image projected on the screen 112 is changed from an image captured by the front camera 103 to an image captured by the rear camera 104. In the following descriptions, an image captured by the rear camera 104 may be referred to as a rear image.

Figure 4B:
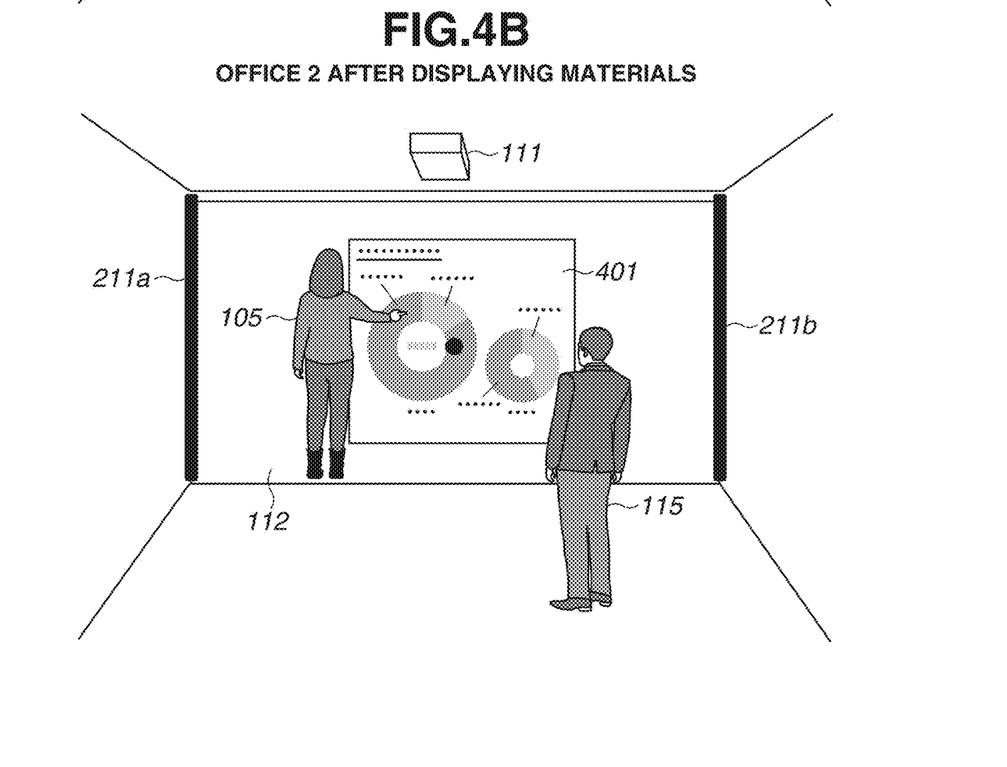

FIG. 4B illustrates a situation in which an image projected on the screen 112 is changed from the front image captured by the front camera 103 to the rear image captured by the rear camera 104 in the office 2. In response to displaying of a meeting material 401, the situation in the office 2 is switched from FIG. 4A to FIG. 4B. When the image projected on the screen 112 is switched from the front image to the rear image as in FIG. 4B, the person 115 in the office 2 can grasp where the person 105 in the office 1 points at on the meeting material. In addition, the person 115 in the office 2 can have a feeling of viewing the same meeting material beside the person 105 in the office 1. The meeting material is stored in the HDD 305 in the office 1 or a HDD 325 in the office 2 and projected on the screen by the projector in response to a user operation. A storage place of the meeting material is not limited to the above-described HDD and may be a storage server on the network 300.

The configuration for switching the image projected on the screen from the front image to the rear image when the meeting material is displayed has been described above with reference to FIGS. 4A and 4B. The present exemplary embodiment is characterized in that an image transmitting side selects which one of the front image and the rear image is transmitted to the remote place, and thus the image projected on the screen is switched. For example, in the case of FIGS. 4A and 4B, the control server 301 in the office 1 selects which one of the front image and the rear image is transmitted to the office 2, and thus the image projected on the screen 112 in the office 2 is switched.

Figure 5:
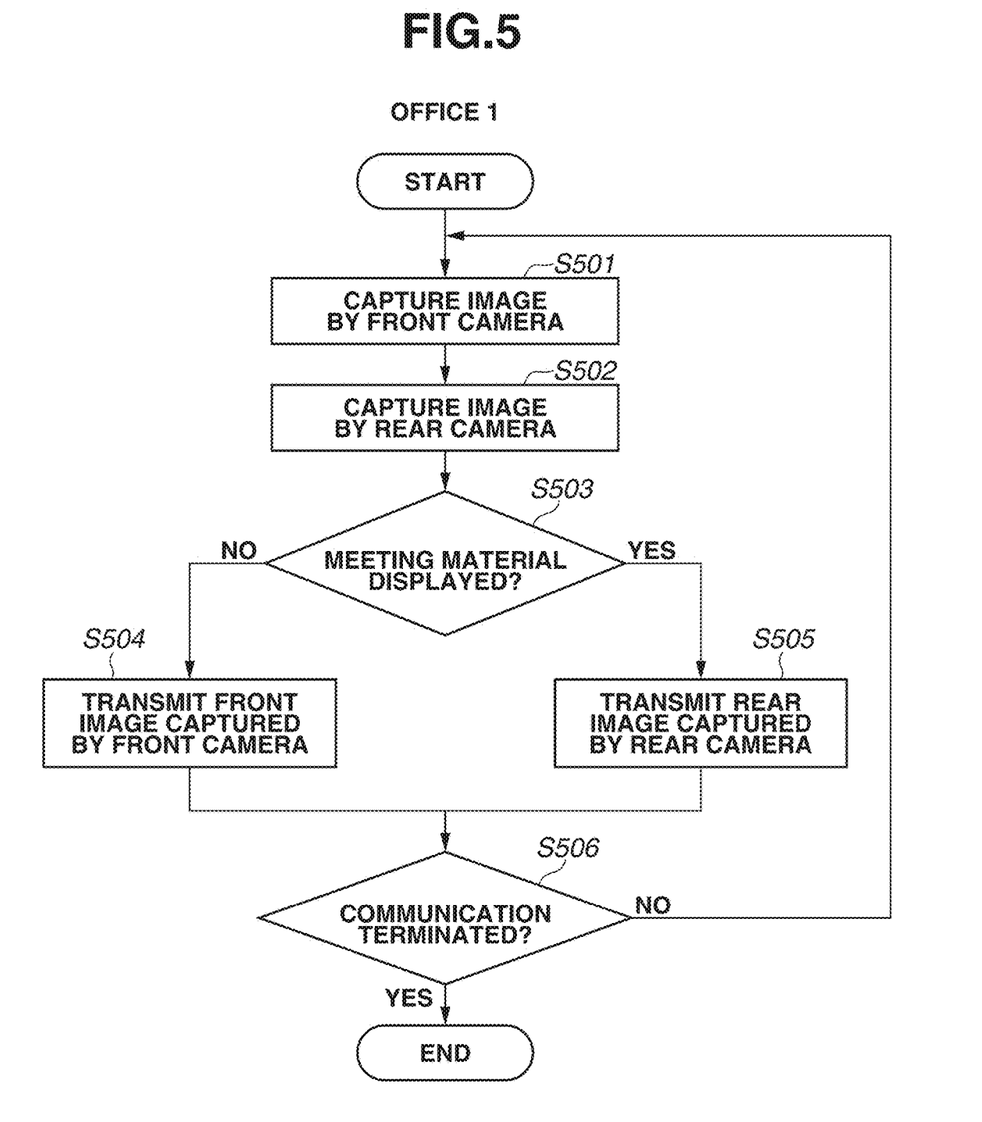
FIG. 5 is a flowchart illustrating processing according to a first exemplary embodiment.

FIG. 5 is a flowchart illustrating processing executed by the control server 301 in the office 1. Each step in the flowchart illustrated in FIG. 5 is processed by the CPU 302 reading a control program stored in a memory such as the ROM 304 and developing and executing the control program in the RAM 303.

First, in step S501, the CPU 302 causes the front camera 103 to capture an image. Next, in step S502, the CPU 302 causes the rear camera 104 to capture an image. By the processing in step S501 and step S502, the CPU 302 can obtain a front image and a rear image. Which one of the front image and the rear image is captured first is not limited to an order of the present flowchart. The rear image may be captured first, or the front image and the rear image may be captured at the same time.

Next, in step S503, the CPU 302 determines whether a meeting material is displayed on the screen 102. When a meeting material (for example, the meeting material 401) is not projected on the screen 102 by the projector 101, in step S503, the CPU 302 determines that the meeting material is not displayed (NO in step S503), and the processing proceeds to step S504. On the other hand, when a meeting material is projected on the screen 102 by the projector 101, in step S503, the CPU 302 determines that the meeting material is displayed (YES in step S503), and the processing proceeds to step S505.

According to the present exemplary embodiment, when a file in a predetermined format, for example, a file of which extension is ".doc" or ".ppt" is projected on the screen 102, the CPU 302 determines that the file is the meeting material. As another exemplary embodiment, when a file which includes a predetermined character string, for example, "meeting" and "material" in a file name is projected on the screen 102, it may be determined that the file is the meeting material. Further, when optical character recognition (OCR) processing is performed on a paper document projected on the screen 102, and a predetermined character string, for example, "meeting" and "material" is detected as a result of the OCR processing, it may be determined that the meeting material is displayed on the screen 102.

Next, step S504 is described. When the meeting material is not displayed on the screen 102, in step S504, the CPU 302 controls the network I/F 310 to transmit the front image captured by the front camera 103 to the office 2. Why the front image is transmitted instead of the rear image in step S504 is because it is desirable that the person 115 and the person 105 communicate with each other face-to-face as described in FIG. 4A. In the office 2 which received the front image transmitted in step S504, the projector 111 projects the received front image on the screen 112 (for example, FIG. 4A).

Next, step S505 is described. When the meeting material is displayed on the screen 102, in step S505, the CPU 302 controls the network I/F 310 to transmit the rear image captured by the rear camera 104 to the office 2. Why the rear image is transmitted instead of the front image in step S505 is to make the person 115 in the office 2 grasp where the person 105 in the office 1 points at on the meeting material as described in FIG. 4B. In the office 2 which received the rear image transmitted in step S505, the projector 111 projects the received rear image on the screen 112 (for example, FIG. 4B).

Next, in step S506, the CPU 302 determines whether communication between the office 1 and the office 2 is terminated. For example, when a predetermined termination operation is performed by a user, the CPU 302 determines that the communication is terminated (YES in step S506) and terminates the processing in the flowchart illustrated in FIG. 5. On the other hand, when the CPU 302 determines that the communication is not terminated (NO in step S506), the processing returns to step S501.

As described above, the present exemplary embodiment is characterized in that the rear image captured by the rear camera is used in addition to the front image captured by the front camera to communication with the remote place. Accordingly, for example, when a person in the remote place points at the meeting material, a person on an image receiving side can grasp where the relevant person points at on the meeting material.

Further, according to the present exemplary embodiment, when the meeting material is displayed, the image projected on the screen is automatically switched from the front image to the rear image. Accordingly, a user of the communication system can smoothly communicate with another user in the remote place without being conscious of a switching operation of the front image and the rear image.

Next, a second exemplary embodiment is described as a modification of the first exemplary embodiment. A hardware configuration of a communication system according to the present exemplary embodiment is similar to that in the first exemplary embodiment, and thus the description thereof is omitted.

According to the present exemplary embodiment, an image transmitting side transmits both of the front image and the rear image to the remote place. Then, an image receiving side selects which of the front image and the rear image is projected on the screen. For example, in the case of FIGS. 4A and 4B, the control server 321 in the office 2 receives from the office 1 both of the front image and the rear image, selects either one of the received front image and rear image, and projects the selected image on the screen 112.

Figure 6:
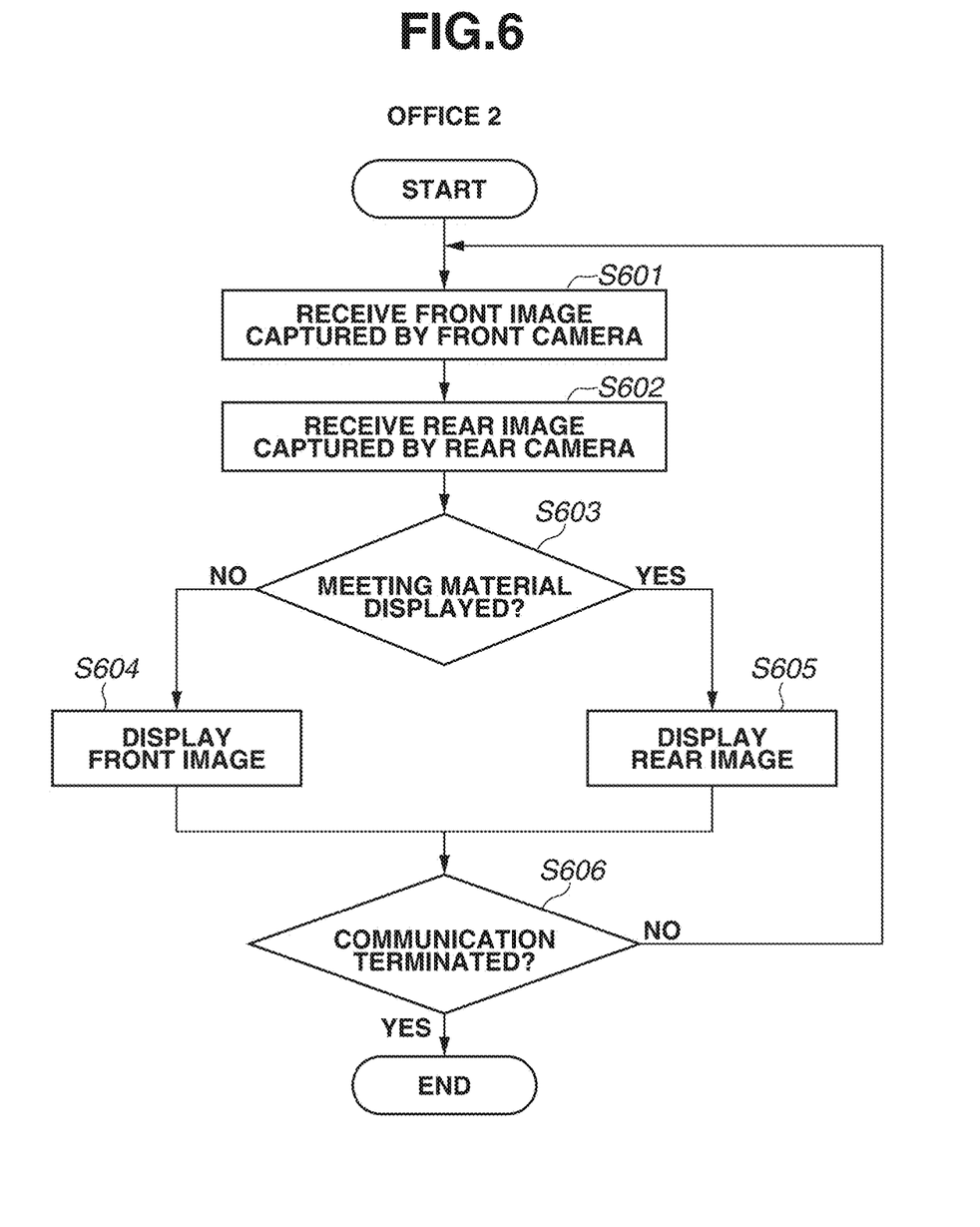
FIG. 6 is a flowchart illustrating processing according to a second exemplary embodiment.

FIG. 6 is a flowchart illustrating processing executed by the control server 321 in the office 2. Each step in the flowchart illustrated in FIG. 6 is processed by the CPU 322 reading a control program stored in a memory such as the ROM 324 and developing and executing the control program in the RAM 323.

First, in step S601, the CPU 322 receives the front image captured by the front camera 103 in the office 1 from the office 1 via a network I/F 330. Next, in step S602, the CPU 322 receives the rear image captured by the rear camera 104 in the office 1 from the office 1 via the network I/F 330. Which one of the front image and the rear image is received first is not limited to an order of the present flowchart. The rear image may be received first, or the front image and the rear image may be received at the same time.

Next, in step S603, the CPU 322 determines whether a meeting material is displayed on the screen 112. The processing in step S603 is similar to that in step S503 in FIG. 5, and thus the description thereof is omitted.

When the meeting material is not displayed on the screen 112 (NO in step S603), the processing proceeds to step S604. In step S604, the CPU 322 controls the projector 111 to project the front image captured by the front camera 103 in the office 1 from among the received images.

On the other hand, when the meeting material is displayed on the screen 112 (YES in step S603), the processing proceeds to step S605. In step S605, the CPU 322 controls the projector 111 to project the rear image captured by the rear camera 104 in the office 1 from among the received images.

In step S606, the CPU 322 determines whether communication between the office 1 and the office 2 is terminated. The processing in step S606 is similar to that in step S506 in FIG. 5, and thus the description thereof is omitted.

As described above, according to the present exemplary embodiment, when the meeting material is displayed, the image projected on the screen can be automatically switched from the front image to the rear image as in the case of the first exemplary embodiment (Other Embodiments)

According to each of the above-described exemplary embodiments, a configuration is described which selects either of a front image and a rear image to display based on information displayed on a screen. As another exemplary embodiment, an image to be displayed may be selected by detecting a specific action such as pointing by a user (the person 105 and the person 115) by a digitizer. For example, when the digitizer detects a pointing action of a user, an image displayed on a screen may be switched from a front image to a rear image.

As further another exemplary embodiment, an image to be displayed may be selected based on a distance between a screen and a person. For example, when a distance between the screen 102 and the person 105 detected by the distance sensor of the front camera 103 is equal to or less than a threshold value, an image displayed on the screen 112 may be switched from a front image to a rear image.

Furthermore, switching of display of a front image and a rear image may be realized by a manual operation by a user. For example, a switch button which can detect a touch operation by a user may be displayed on a screen, and an image to be displayed may be switched from a front image to a rear image or from a rear image to a front image in response to a touch by the user.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-095886, filed May 8, 2015, which is hereby incorporated by reference herein in its entirety.

What is claimed is:

1. A communication system comprising:
   a first projection unit configured to project an image on a first projection surface;
   a first imaging unit configured to capture a first image of a person located in front of the first projection surface from a first projection surface side, the first imaging unit being disposed on or embedded in the first projection surface;
   a second imaging unit configured to capture a second image of the person from an opposite side of the person, the second imaging unit being disposed or located at a predetermined position that is spaced away and separate from the first projection surface and the second imaging unit facing towards the first projection surface;

a selection unit configured to select either of the first person image captured by the first imaging unit and the second person image captured by the second imaging unit as a person image to be projected on a second projection surface; and a second projection unit configured to project the person image selected by the selection unit on the second projection surface.

2. The communication system according to claim 1, wherein,
in a case where the person comes close to the first projection surface, the selection unit selects the second person image.

3. The communication system according to claim 1, wherein,
in a case where a distance between the person and the first projection surface is equal to or less than a predetermined threshold value, the selection unit selects the second person image.

4. The communication system according to claim 1, wherein,
in a case where a predetermined file is displayed on the first projection surface, the selection unit selects the second person image.

5. The communication system according to claim 4, wherein,
the predetermined file is a meeting material.

6. The communication system according to claim 1, wherein,
in a case where the person performs a predetermined action, the selection unit selects the second person image.

7. The communication system according to claim 6, wherein,
the predetermined action is a pointing action.

8. The communication system according to claim 1, wherein at least one of:
(i) the first imaging unit and the second imaging unit are set or positioned in opposite directions to obtain the first image of the person and the second image of the person on opposite sides of the person, the first imaging unit facing away from the first projection surface and towards the second imaging unit and the second imaging unit facing towards the first projection surface and the first imaging unit;
(ii) the first imaging unit and the first projection surface are disposed on a first side of the communication system and the second imaging unit is disposed on a second side of the communication system, the first and second sides being opposite sides of the communication system;
(iii) the first imaging unit is coplanar with the first projection surface in a first plane and with the second imaging unit in a second plane, the first plane and the second plane being different planes that are not coplanar with each other; and
(iv) in response to the user directly facing the first projection surface, the first imaging unit operates to capture a front side of the person and the second imaging unit operates to capture a back side of the person.

9. The communication system according to claim 1, wherein the second imaging unit further operates to capture the second image to show the person pointing at a material or object being displayed on the first projection surface.

10. A communication system comprising:
a first projection unit configured to project an image on a first projection surface;
a first imaging unit configured to capture a first image of a person located in front of the first projection surface from a first projection surface side, the first imaging unit being disposed on or embedded in the first projection surface;
a second imaging unit configured to capture a second image of the person from an opposite side of the person, the second imaging unit being disposed or located at a predetermined position that is spaced away and separate from the first projection surface and the second imaging unit facing towards the first projection surface;
a selection unit configured to select either of the first person image captured by the first imaging unit and the second person image captured by the second imaging unit as a person image to be projected on a second projection surface of a remote place; and
a transmission unit configured to transmit the person image selected by the selection unit to the remote place.

11. The communication system according to claim 10, wherein,
in a case where the person comes close to the first projection surface, the selection unit selects the second person image.

12. The communication system according to claim 10, wherein,
in a case where a distance between the person and the first projection surface is equal to or less than a predetermined threshold value, the selection unit selects the second person image.

13. The communication system according to claim 10, wherein,
in a case where a predetermined file is displayed on the first projection surface, the selection unit selects the second person image.

14. The communication system according to claim 13, wherein,
the predetermined file is a meeting material.

15. The communication system according to claim 10, wherein,
in a case where the person performs a predetermined action, the selection unit selects the second person image.

16. The communication system according to claim 15, wherein,
the predetermined action is a pointing action.

17. The communication system according to claim 10, wherein at least one of:
(i) the first imaging unit and the second imaging unit are set or positioned in opposite directions to obtain the first image of the person and the second image of the person on opposite sides of the person, the first imaging unit facing away from the first projection surface and towards the second imaging unit and the second imaging unit facing towards the first projection surface and the first imaging unit;
(ii) the first imaging unit and the first projection surface are disposed on a first side of the communication system and the second imaging unit is disposed on a second side of the communication system, the first and second sides being opposite sides of the communication system;

(iii) the first imaging unit is coplanar with the first projection surface in a first plane and with the second imaging unit in a second plane, the first plane and the second plane being different planes that are not coplanar with each other; and (iv) in response to the user directly facing the first projection surface, the first imaging unit operates to capture a front side of the person and the second imaging unit operates to capture a back side of the person.

18. The communication system according to claim 10, wherein the second imaging unit further operates to capture the second image to show the person pointing at a material or object being displayed on the first projection surface.

19. A communication system comprising:
   a reception unit configured to receive a first person image capturing a person located in front of a first projection surface of a remote place from a first projection surface side and a second person image capturing the person from an opposite side of the person from the remote place, the first person image being taken via a first imaging device disposed on or embedded in the first projection surface of the remote place and the second person image being taken via a second imaging device disposed or located at a predetermined position that is spaced away and separate from the first projection surface of the remote place, the second imaging device facing towards the first projection surface;
   a selection unit configured to select either of the first person image and the second person image as a person image to be projected on a second projection surface; and
   a projection unit configured to project the person image selected by the selection unit on the second projection surface.

20. The communication system according to claim 19, wherein,
   in a case where the person comes close to the first projection surface, the selection unit selects the second person image.

21. The communication system according to claim 19, wherein,
   in a case where a distance between the person and the first projection surface is equal to or less than a predetermined threshold value, the selection unit selects the second person image.

22. The communication system according to claim 19, wherein,
   in a case where a predetermined file is displayed on the first projection surface, the selection unit selects the second person image.

23. The communication system according to claim 22, wherein,
   the predetermined file is a meeting material.

24. The communication system according to claim 19, wherein,
   in a case where the person performs a predetermined action, the selection unit selects the second person image.

25. The communication system according to claim 24, wherein,
   the predetermined action is a pointing action.

* * * * *